May 15, 1956 — O. V. SAUNDERS — 2,745,259
REFRIGERATOR WITH MEANS TO COOL SHELVES ADJACENT
AN INSULATED FREEZING COMPARTMENT
Filed Feb. 14, 1955 — 2 Sheets-Sheet 1
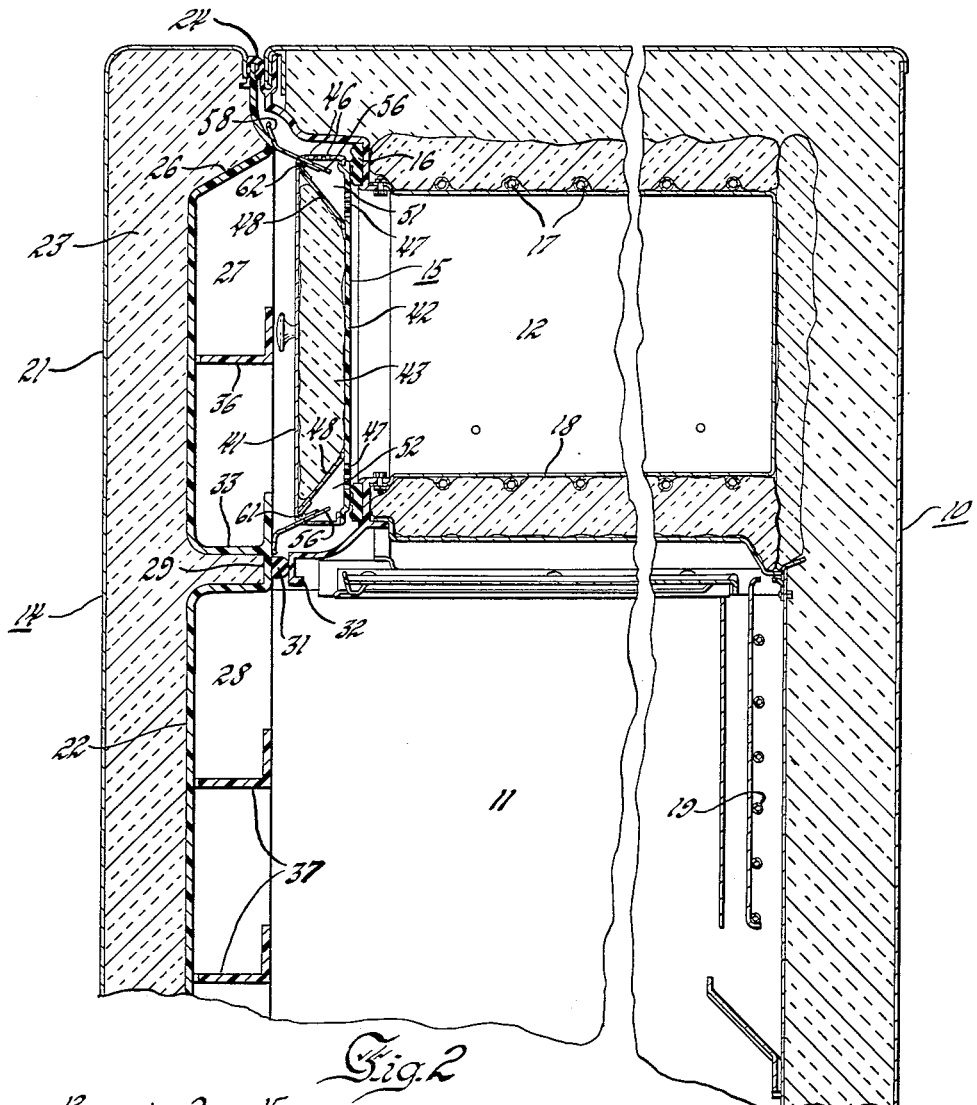
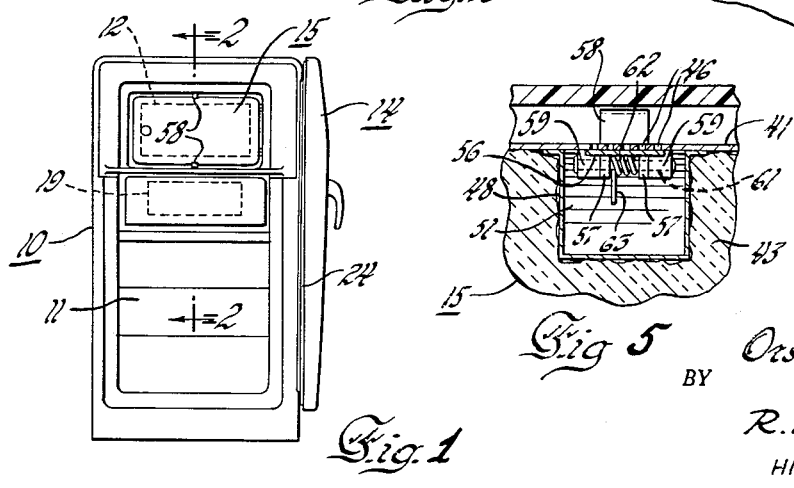
INVENTOR.
Orson V. Saunders
BY
R. R. Candor.
HIS ATTORNEY.

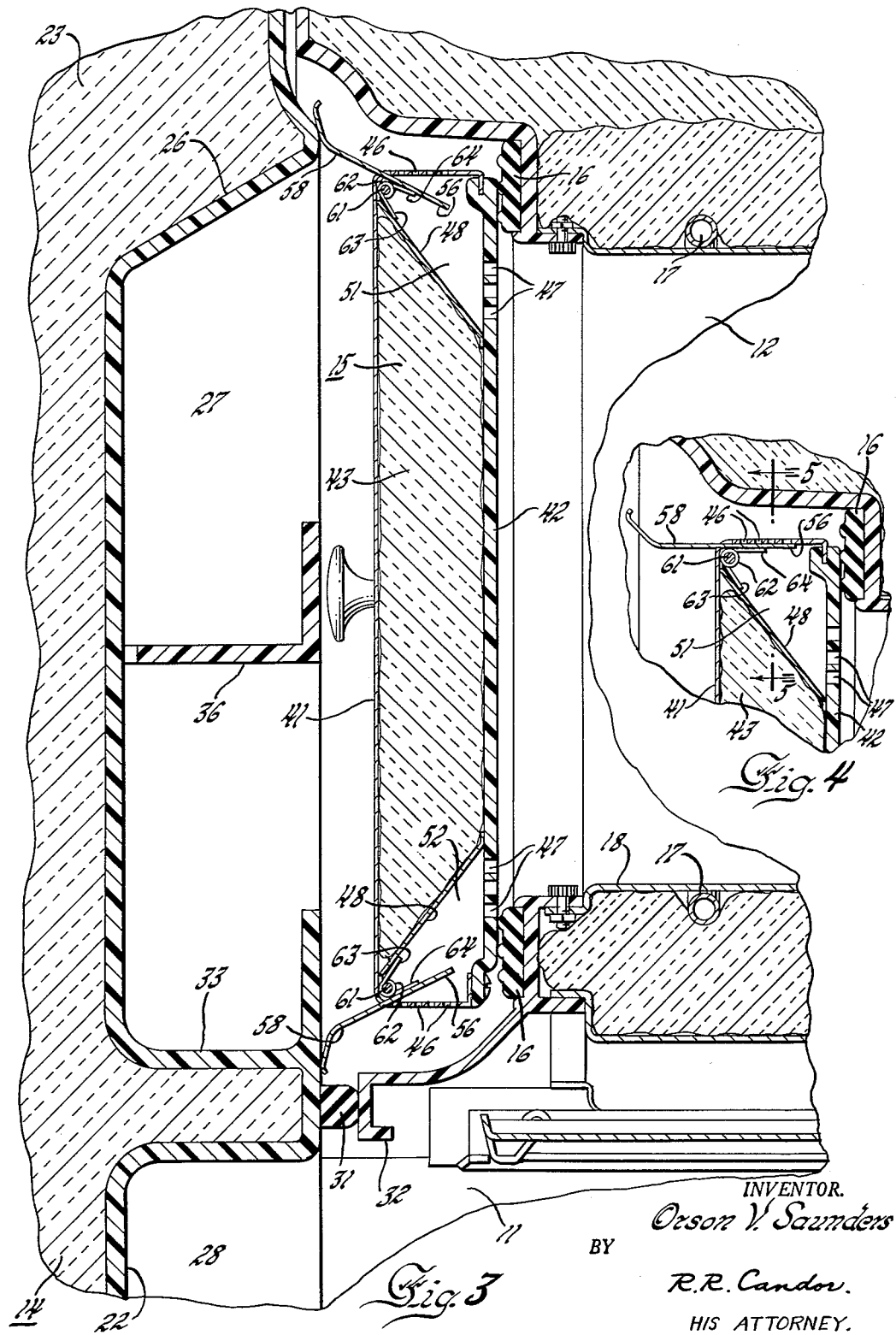

United States Patent Office 2,745,259
Patented May 15, 1956

2,745,259

REFRIGERATOR WITH MEANS TO COOL SHELVES ADJACENT AN INSULATED FREEZING COMPARTMENT

Orson V. Saunders, Dayton, Ohio, assignor to General Motors Corporation, Detroit, Mich., a corporation of Delaware Application February 14, 1955, Serial No. 487,960

2 Claims. (Cl. 62—89)

This invention relates to refrigeration and particularly to an arrangement for and method of refrigerating food products stored on door shelves in a refrigerator cabinet.

In present-day refrigerator cabinets of the type having a freezing or frozen food storage compartment and a higher temperatured or unfrozen food storage compartment therein and insulated from the frozen food compartment wherein an insulated inner door, separate from an outer door which is common to and closes both compartments, is utilized to seal the open front of the frozen food compartment, food products stored on shelves on the common door adjacent to or opposite the insulated inner door are not refrigerated to a proper or satisfactory temperature. This is due to the fact that the space between the two insulated doors forms a dead air pocket, and air cooled and caused to be circulated by an evaporator of a refrigerating system in the unfrozen food compartment will not enter such pocket to chill the products on door shelves disposed therein. The present invention relates specifically to the provision of means in this type refrigerator for effectively chilling food products on a door shelf located in the space at the front of a door affording access to the frozen food compartment.

An object of my invention is to provide an improved arrangement for cooling food products on shelves carried on the inner face of a refrigerator cabinet door.

Another object of my invention is to provide means whereby food products located on certain of a plurality of vertically spaced apart refrigerator door shelves will be cooled to the same or to a lower temperature than food products stored on other of the plurality of door shelves.

A further object of my invention is to provide means for transferring heat from food products stored on a refrigerator cabinet door shelf in front of an insulated inner freezer or frozen food compartment closing door through this door and to an evaporator of a refrigerating system associated with and employed to cool the interior of the frozen food compartment.

In carrying out the foregoing objects, it is a still further and more specific object of my invention to isolate certain vertically spaced apart shelves from others thereof located in recesses in the inner face of a large refrigerator cabinet door when this door is closed and to refrigerate food products on the isolated shelves from the evaporator employed to cool the frozen food compartment in the refrigerator by forming valved air passageways through the smaller inner door closing the frozen food compartment, which passageways are normally open and are closed automatically in response to opening the large door.

Further objects and advantages of the present invention will be apparent from the following description, reference being had to the accompanying drawings wherein a preferred form of the invention is clearly shown.

In the drawings:

Figure 1 is a front view of a refrigerator cabinet having my invention embodied therein and showing the cabinet door in open position;

Figure 2 is a broken fragmentary enlarged vertical sectional view of the refrigerator shown in Figure 1 and is taken on the line 2—2 thereof showing two compartments within the cabinet;

Figure 3 is an enlarged fragmentary section of a portion of the refrigerator cabinet disclosed in Figures 1 and 2 showing open valved air passageways in the door of the freezing compartment of the refrigerator;

Figure 4 is a fragmentary sectional view of one of the valved passageways in the freezing compartment door of the refrigerator showing the valve thereof in closed position; and Figure 5 is a sectional view taken on the line 5—5 of Figure 4 showing the mounting of a valve in the valved passageways.

Referring to the drawings, wherein my invention is illustrated, there is shown a multiple compartment two-temperature household refrigerator cabinet of the type fully described in my copending application S. N. 369,373, filed July 21, 1953, entitled "Refrigerating Apparatus" and assigned to the assignee of this application. Since the construction of the refrigerator herein disclosed is generally the same as is illustrated and described in my copending application referred to, no elaborate or lengthy description of the cabinet thereof is believed necessary herein. The refrigerator cabinet indicated at 10 has a lower unfrozen food storage compartment 11 therein utilized to store leftover foods from the table. Cabinet 10 also has an upper freezing or frozen food storage compartment 12 therein suitably insulated by a partitioning wall from compartment 11. A first large insulated door structure indicated at 14 is hingedly mounted upon cabinet 10 and extends continuously over the front portion of the cabinet to provide a common closure for both compartments 11 and 12. A second smaller inner insulated door structure indicated at 15 is hingedly mounted within cabinet 10 for horizontal swinging movement and normally closes the open front of upper frozen food compartment 12 so as to prevent communication of air between compartments 11 and 12. The inner face of door 15 normally abuts against a soft rubber-like gasket 16 carried at and extending around the front of freezing compartment 12 (see Figures 2 and 3). A refrigerating system associated with cabinet 10 includes a refrigerant translating device (not shown) and an evaporator or refrigerant evaporating portion in the form of a conduit 17 wrapped or coiled around a metal can-like liner 18 providing walls of compartment 12 for cooling air in this compartment. The refrigerating system also includes another frosting and defrosting evaporator or refrigerant evaporating conduit 19 secured to a metal plate located in the unfrozen food storage compartment 11 for cooling and causing circulation of air in this compartment. The structure for and method of supporting liner 18 of compartment 12 above the liner of compartment 11 in cabinet 10 is fully described in my copending application above referred to.

The large or common cabinet door 14 comprises an outer metallic pan or panel 21 and an inner preferably molded plastic panel 22 having insulating material 23 disposed therebetween (see Figure 2). A rubber-like gasket 24 extends entirely around door 14 and is held in place thereon between the panels thereof by suitable screws (not shown) in a manner now well known to those skilled in the art. The inner panel 22 of common door 14 is dished in a direction toward door pan 21 inwardly of its peripheral edges, as at 26, to provide the back, top, bottom and sides of two recesses or recessed portions 27 and 28 in the inner face of door 14. The wall 29 of panel 22 intermediate the recesses 27 and 28 in door 14 has a rubber-like gasket 31 secured thereto in any suitable or conventional manner. Gasket 31 is adapted, when door 14 is closed, or shut, to seal against the front edge portion of a part 32 of the insulated partitioning wall structure between compartments 11 and 12 for a purpose to be hereinafter described. The outwardly extending part on the insulated partition between compartments 11 and 12 in the present invention differs from that shown in my copending application above referred to in that the communicating air passage between the compartments in this extension 32 has been omitted for reasons which will become apparent hereinafter. The bottom 33 of the uppermost dished portion 26 forming recess 27 is substantially flat and provides a food supporting shelf or shelf means on the inner face of door 14. Other, preferably molded plastic food supporting shelves, or shelf means 36 and 37 are located in the recesses 27 and 28 respectively intermediate the tops and bottoms thereof (see Figure 2). The shelves or shelf means 36 and 37 may be secured to door panel 22 in any suitable and now well-known manner. The shelves 37 in lower recess 28 are disposed on door 14 in a position whereby they will be in horizontal alignment with the open front of unfrozen food compartment 11 and exposed to the cool air circulating therein, when door 14 is closed, for refrigerating food products supported on these shelves. Gasket 31 engages and seals against the part 32 of the insulated partitioning wall between compartments 11 and 12, when door 14 is closed, to isolate the recesses 27 and 28 from one another and for preventing communication of air in compartment 11 with the shelves 33 and 36 in recess 27.

A small freezing compartment door 15 also comprises a metallic outer panel or pan 41 and an inner molded plastic panel 42 with insulating material 43 disposed therebetween (see Figure 3). This door 15 may be of the same general construction and assembled in like manner to the freezer compartment door disclosed in my copending application S. N. 381,771, filed September 23, 1953, now Patent No. 2,708,294, entitled "Refrigerator Door," and assigned to the assignee of this application. The construction of door 15 is, however, modified as will now be described for the purpose of accomplishing the objects of the present invention and is preferably mounted on vertical hinges for horizontal swinging movement. Such freezing or frozen food storage compartment doors are usually well insulated to prevent conduction or flow of the low temperature in the compartment therefrom. Since the door shelves 33 and 36 in the upper recess 27 of door 14, opposite or in front of door 15, are located in a dead air pocket or are substantially isolated from the air in lower unfrozen food storage compartment 11, it is difficult to refrigerate food products placed on shelves 33 and 36 to a proper or satisfactory temperature. No difficulty is encountered in refrigerating food products placed on the shelves 37 in the lower recess 28 of door 14 because they are openly exposed to the temperature produced by the plate-like evaporator 19. I, therefore, provide means whereby food products placed on the shelves 33 and 36 in the upper recess 27 of door 14 are satisfactorily refrigerated by transferring heat from these latter mentioned products through door 15 to the other or low temperature evaporator 17 employed to cool frozen food compartment 12. In other words, my invention contemplates the refrigeration of food products stored on certain shelves on a refrigerator door from one evaporator of the refrigerating system within the cabinet while food products stored on certain other of the shelves on the door are refrigerated from another evaporator of the refrigerating system. This means in the present disclosure is in the form of valved passageways extending through the upper and lower portions of insulated door 15.

Referring now to Figure 3 of the drawings, it will be noted that the top and bottom inturned bent portions of outer pan 41 of door 15 are provided with a plurality of holes 46 and that the upper and lower portions of panel 42 on this door are also provided with a plurality of holes 47. A box-like baffle 48, open at its top and at one side thereof, is secured to the outer door pan 41 within door 15 in any suitable or conventional manner, and this baffle together with the openings or holes 46 and 47 provide upper and lower air passageways 51 and 52 respectively extending through door 15. It is desired to provide means for controlling the passageways 51 and 52 so that they will be open when door 14 is shut and will be closed when door 14 is opened. This prevents loss of cold air from the frozen food compartment 12 when door 14 is moved to an open position. Such controlling means in the present disclosure includes a valve 56 having mounting bosses 57 (see Figure 5) and an integral camming finger 58 projecting therefrom and extending outwardly of door 15 through a suitable opening provided in the outer pan 41 thereof for a purpose to be more fully described hereinafter. Short spaced apart tubular metal bearing members 59 are welded or otherwise suitably secured to the inner surface of pan 41 of door 15 (see Figure 5) for supporting the valves 56. A pin or small shaft 61 located in the spaced apart bearing members 59 and extending through the bosses 57 on valves 56 pivotally mount these valves within door 15. A tension spring 62 coiled around pin 61, intermediate the bosses 57 on the valves 56, has its one end 63 engaging a wall of baffle 48 and has its other end 64 bearing against valve 56 for biasing the valves toward the inturned bent top and bottom wall portions of door pan 41 to close the openings 46.

When the present refrigerator is installed for use and the refrigerating system associated therewith is operated to reduce the temperature in compartments 11 and 12, the large insulated door 14 common to both of these compartments is closed. Closing of door 14 causes portions of its inner panel 22 to engage the cam fingers 58 and move the valves 56 about their pivotal mounting, pins 61, into an open position (see Figures 2 and 3) thus uncovering or opening the air holes 46 in pan 41 of the second or inner door 15. As long as door 14 remains shut, portions of its inner face bear against the fingers 58 to hold valves 56 open against the tension of springs 62. Heat of food products stored upon shelves 33 and 36 in recess 27 of door 14 may be transferred through this door to the second or freezing evaporator 17 employed to cool the frozen food storage compartment 12. In order to accomplish this, some cold air flows out of compartment 12 by way of the lower holes 47 in door panel 42 and through passage or passageway 52 and holes 46 to the outer side of door 15. While the flow of air out and into compartment 12 is or may be somewhat restricted, it is ample to effectively refrigerate food products in the isolated recess 27 of door 14 to a temperature at least equal to the temperature of food products supported on the shelves 37 within the recessed portion 28 of door 14 which are openly exposed to cool air circulated by evaporator 19 in the unfrozen food storage compartment 11. Since as a general rule the common or large door 14 is opened more frequently than the freezer compartment door 15, the valved passageways 51 and 52 in door 15 should be closed when door 14 is so opened. Thus as door 14 is swung toward open position, its inner panel 22 moves away from the camming fingers 58 of the valves 56, and springs 62 thereupon close these valves (see Figures 4 and 5) to prevent loss of refrigeration from the freezing compartment 12 to air ambient of cabinet 10. As door 14 is returned to closed position, it engages the camming fingers 58 to swing the valves 56 into a position to open the passageways 51 and 52 for reestablishing communication of air in the frozen food compartment 12 with food products stored on shelves 33 and 36 in the recess 27 of large door 14 as shown in Figures 2 and 3.

From the foregoing, it should be apparent that I have provided an improved multiple compartment household refrigerator wherein food products, regardless of which of the shelves carried by the cabinet door they are placed upon for storage, will be effectively refrigerated. My improvement eliminates customer complaints of food products not being cooled to the proper temperature when placed on certain shelves on a door of a refrigerator cabinet. The arrangement in the present refrigerating apparatus is fully automatic and needs no manual adjustment or attention on the part of the user of the refrigerator. I have eliminated the presence of so-called dead air pockets in a multiple compartmented refrigerator cabinet and rendered every nook or space therein satisfactory for the storage of various types of food products.

While the form of embodiment of the invention as herein disclosed constitutes a preferred form, it is to be understood that other forms might be adopted as may come within the scope of the claims which follow.

What is claimed is as follows:

1. A refrigerator including a cabinet having an open front unfrozen food storage compartment and a front access opening frozen food storage compartment thereing insulated from said unfrozen food compartment, a refrigerating system associated with said cabinet including a first evaporator for cooling air in said unfrozen food compartment and a second evaporator for cooling air in said frozen food compartment, a common door extending across the access opening of both of said compartments, an inner door between said common door and said frozen food compartment for closing the access opening thereof, said common door having food supporting shelf means on its inner face located opposite said inner door, means for transferring heat from food products placed on said shelf means to said second evaporator for refrigerating same, said last named means including valved air passageways extending through said inner door, and means for maintaining said valved passageways open when the common door is shut and for closing said passageways automatically in response to opening said common door.

2. A refrigerator including a cabinet having an open front unfrozen food storage compartment and a front access opening frozen food storage compartment therein insulated from said unfrozen food compartment, a refrigerating system associated with said cabinet including a first evaporator for cooling air in said unfrozen compartment and a second evaporator for cooling air in said frozen food compartment, a common door extending across the access opening of both of said compartments, an inner door between said common door and said frozen compartment for closing the access opening thereof, said common door being provided with a recess in its inner face located opposite said inner door, food supporting shelf means in the recess of said common door, means for isolating said food supporting shelf means from said unfrozen food storage compartment when said common door is closed to prevent air in said unfrozen food compartment from communicating with said shelf means, means for transferring heat from food products placed on said shelf means to said second evaporator for refrigerating same, said last named means including upper and lower valved air passageways extending through said inner door, means associated with the valves of said passageways engageable by said common door upon shutting same to maintain the passageways open, and spring means for automatically closing said passageways in response to opening said common door.

References Cited in the file of this patent

UNITED STATES PATENTS

| | | |
|---|---|---|
| 2,136,558 | Maushel | Nov. 15, 1938 |
| 2,434,117 | Money et al. | Jan. 6, 1948 |
| 2,515,584 | Benson | July 18, 1950 |
| 2,710,508 | Staebler et al. | June 14, 1955 |